(12) United States Patent
Kajander

(10) Patent No.: US 6,331,339 B1
(45) Date of Patent: Dec. 18, 2001

(54) WOOD LAMINATE AND METHOD OF MAKING

(75) Inventor: Richard Emil Kajander, Toledo, OH (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 09/085,120

(22) Filed: May 27, 1998

Related U.S. Application Data

(62) Division of application No. 08/728,655, filed on Oct. 10, 1996, now Pat. No. 5,837,620.

(51) Int. Cl.$^7$ ........................................... B32B 5/12
(52) U.S. Cl. .................. 428/114; 428/106; 428/107; 428/109; 428/326
(58) Field of Search .................................. 442/143, 180, 442/63, 150, 172, 331, 385, 59, 85; 428/375, 382, 114, 106, 107, 109, 326

(56) References Cited

U.S. PATENT DOCUMENTS

| | | | |
|---|---|---|---|
| 1,299,747 | 4/1919 | McClain . | |
| 1,960,176 | 5/1934 | Weber et al. | 91/68 |
| 3,413,188 | 11/1968 | Allen | 161/195 |
| 3,669,727 | 6/1972 | Raymond | 117/148 |
| 4,337,290 | 6/1982 | Kelly et al. | 428/201 |
| 4,615,163 | 10/1986 | Curtis et al. | 52/730 |
| 4,954,304 | 9/1990 | Ohtake et al. | 264/137 |
| 5,641,553 | 6/1997 | Tingley | 428/114 |

FOREIGN PATENT DOCUMENTS 55-114561  9/1980  (JP) .

OTHER PUBLICATIONS

Published Patent Application WO 98/49248 Published Nov. 5, 1998.

Proceedings of 1988 International Conference on Timber Engineering, vol. 1, pp. 39–57 from Wood and Fiber Science, vol. 18(1), Jan., 1986.

*Primary Examiner*—Richard Weusberger
(74) *Attorney, Agent, or Firm*—John H. Miller

(57) ABSTRACT

A method of making a fiber glass mat especially useful for bonding to wood contains glass fibers and a "B" staged resin is disclosed. A substantial portion of the resin binder can be a furfuryl alcohol formaldehyde, phenol formaldehyde, melamine formaldehyde, or any other resin that can be "B" staged. Also, a method of making wood and wood product laminates using this new mat without any other adhesives, and the resultant laminates are disclosed.

12 Claims, No Drawings

WOOD LAMINATE AND METHOD OF MAKING

This application is a division of U.S. application Ser. No. 08/728,655, filed Oct. 10, 1996 now U.S. Pat. No. 5,837,620 issued on Nov. 11, 1998.

The present invention involves a method of making mats having particular use in bonding to wood and in making improved wood products and the method of making such mats. The mats produced according to this invention are useful as reinforcement and dimensional stabilizers for making a large number of novel laminate products such as wood laminates of all types, hard faced wood products such as plywood and hardboard for making concrete forms and many other similar uses. The mats are also useful as stabilizing and reinforcing substrates for various other products. The invention also includes the method of making the laminates and the resulting laminates.

BACKGROUND

It is known to make reinforcing mats from glass fibers and to use these mats as substrates in the manufacture of a large number of roofing products. Any known method of making nonwoven mats can be used, such as the conventional wet laid processes described in U.S. Pat. Nos. 4,112,174, 4,681,802 and 4,810,576, the disclosures of which are incorporated herein by reference. In these processes a slurry of glass fiber is made by adding glass fiber to a typical white water in a pulper to disperse the fiber in the white water forming a slurry having a fiber concentration of about 0.2–1.0 weight %, metering the slurry into a flow of white water to dilute the fiber concentration to 0.1 or below, and depositing this mixture on to a moving screen forming wire to dewater and form a wet nonwoven fibrous mat.

This wet nonwoven mat of glass fiber is then transferred to a second moving screen and run through a binder application saturating station where an aqueous binder mixture, such as an aqueous urea formaldehyde (UF) resin based binder mixture, is applied to the mat in any one of several known ways. The binder saturated mat is then run over a suction section while still on the moving screen to remove excess binder. The wet mat is then transferred to a wire mesh moving belt and run through an oven to dry the wet mat and to cure (polymerize) the UF based resin binder which bonds the fibers together in the mat. Preferably, the aqueous binder solution is applied using a curtain coater or a dip and squeeze applicator, but other methods of application such as spraying will also work.

In the drying and curing oven the mat is subjected to temperatures up to 450 or 500 degrees F. for periods usually not exceeding 1–2 minutes and as little as a few seconds. Alternative forming methods include the use of well known processes of cylinder forming, continuous strand mat forming which lays continuous strands of glass fibers in overlapping swirls, and "dry laying" using carding or random fiber distribution.

UF resins, usually modified with one or more of acrylic, styrene butadiene, or vinyl acetate resins, are most commonly used as a binder for fiber glass mats because of their suitability for the applications and their relatively low cost. Melamine formaldehyde resins are sometimes used for higher temperature and/or chemical resistant applications. To improve the toughness of the mats, a combination of higher mat tear strength and mat flexibility, which is needed to permit higher processing speeds on roofing product manufacturing lines and for maximum roofing product performance on the roofs and in other applications, it is common to modify or plasticize the UF resins as described above.

Mats made in the above described manner perform well in many applications, but do not provide the bonding strength desired for bonding to wood products.

SUMMARY OF THE INVENTION

In the conventional processes of making a nonwoven fiber mat by the processes described above, a slurry of fiber, preferably glass fiber, is metered into a stream of whitewater, preferably cationic to nonionic, and formed into a wet nonwoven mat on a moving, permeable surface and the mat is thereafter bonded with an aqueous urea formaldehyde (UF) binder, preferably an aqueous UF binder in water and modified by mixing in polyvinyl acetate and/or acrylic tripolymer, dried and cured. The present invention uses this general process to make mats, but includes the improvement of using a different binder resin, an aqueous furfuryl alcohol formaldehyde, phenol formaldehyde, melamine formaldehyde, mixtures of these resins in aqueous solution and other similar resins, to produce mats in which the resin binder is dried and "B" staged, i. e. only partially cured. In a "B" staged condition the resin binder provides adequate strength to handle and further process the mat, but retains the ability to bond to wood and to "flow" (plastic deformation) under heat and pressure prior to finally curing, much like a thermoplastic resin, permitting densification of the fiber glass mat without damaging the fibers before becoming fully cured, i. e. thermoset.

The mats of the present invention comprise glass fibers bonded together with a resin binder wherein the resin binder is only partially cured to a "B" stage condition. The mats of the present invention have lower physical properties initially like tensile strength, hot wet strength and tear strength than conventionally cured mats, but the mats of the present invention surprisingly produce substantially higher bonding strength with wood.

These mats are then used in the manufacture of wood products wherein one or more layers of the inventive mat are bonded to one or more layers of wood or a wood product like particle board, chip board, oriented strand board, plywood, hardboard, etc., and the resulting laminate are then subjected to high pressure and sufficient heat to finish curing the "B" staged resin in the mat, and any additional resin that might be used to bond the mat to the wood. Wood products and laminates made using the mats of the present invention are a part of the present invention and have surprisingly good rigidity and strengths, and when the inventive mats are bonded to the surface of wood or a wood product, the resultant wood product has a surprisingly tough surface. The "B" staged resin in the mat must be compatible with the thermosetting laminating glues used in the wood composite industry, including urea formaldehyde, phenol formaldehyde, melamine formaldehyde and hot melts.

The mats of the present invention can also contain pigments, dyes, flame retardants, and other additives so long as they do not significantly reduce the ability of the mat to bond to a wood surface. The pigments or other additives can be included in the fiber slurry, the binder slurry or can be sprayed or otherwise coated onto the mat later using known techniques.

DETAILED DESCRIPTION OF THE INVENTION

Mats of the present invention contain about 25–75 weight percent fibers and about 15–75 percent binder. The majority of the fibers are glass fibers. The glass fibers which can be used to make mats can have various fiber diameters and lengths dependent on the strength and other properties desired in the mat as is well known. It is preferred that the majority of the glass fibers have diameters in the range of less than 1 up to 23 microns or higher, with the major portion of the fiber being preferably in the range of about 6 to 19 microns and most preferably in the range of about 8 to 16 microns. Up to 50 percent of the glass fibers in the mat, on a weight basis can be microfiber, i. e. fiber having average diameters below 1 micron but, including fiber having average diameters up to 3 microns. The glass fibers can be E glass, C glass, T glass, S glass or any known glass fiber of good strength and durability in the presence of moisture. Normally the glass fibers used all have about the same target length, such as 0.25, 0.5, 0.75, 1 or 1.25 inch, but fibers of different lengths and different average diameters can also be used to get different characteristics in a known manner. Microfibers, by their nature, will usually have random lengths under 0.25 inch. Fibers up to about 3 inches in length can be used in a wet process for making fiber glass mats and even longer fibers can be used in some dry processes. Generally the longer the fiber, the higher the tensile and tear strengths of the mat, but the poorer the fiber dispersion.

While the majority of the fibers used in the present invention are glass fibers, a minor portion of non-glass fibers can also be used, such as cellulosic fibers including wood pulp of all kinds, cotton linters, cellulose derivatives such as cellulose triacetate, rayon, etc. Man made organic fibers such as Nylon™, polyester, polyethylene, polypropylene, etc. can also be used instead of cellulose fibers in any various blends with one or more cellulosic fibers. As will be seen later, it is particularly advantageous to have a higher concentration of cellulosic fibers on one or both surface portions of the mat, extending into the mat thickness a small distance, with a higher concentration of glass fibers in the center portion of the mat to enhance bonding of the mat to wood.

The binders used to bond the fibers together are resins that can be put into aqueous solution or emulsion latex, that can be "B" staged, and that bond good to wood. Typical resin based binders meeting this description are furfuryl formaldehyde, phenol formaldehyde resole and melamine formaldehyde and other similar resins. Of these, furfuryl formaldehyde resin is much preferred because of its bonding power to wood, its ease to "B" stage cure, its reduced levels of volatile organic compound (VOC) emissions, its zero phenol content and its stability in storage. Furan resins of the type useful in this invention are described in U.S. Pat. No. 5,545,825, the disclosure of which is hereby incorporated herein by reference.

A particularly useful furfuryl alcohol formaldehyde resin for use in this invention is a FAREZ® resin, such as XP4, available from Great Lakes Chemical Corporation of West Lafayette, Ind. This resin is a furfuryl alcohol based, highly reactive, water compatible resin containing low levels of volatile components. It has a specific gravity of 1.24 grams/cc, contains 17–21 percent water, has a viscosity of 800–1200 cps., a maximum furfuryl alcohol content of about 1 percent, a maximum free formaldehyde content of about 4 percent and a pH of 4–5. This resin contains only about 2 percent non furfuryl alcohol components which are typically about 0.05 percent water, about 0.3–0.7 percent furfural, and about 0.5 percent 2-methyl furfuryl alcohol. this resin is fully compatible with numerous phenolic, urea and melamine resin based binders.

A particularly useful phenol formaldehyde resin for use in the present invention is GP 144D64, a plasticized phenolic resin available from Georgia Pacific. Another resin useful is a methylated, low formaldehyde melamine formaldehyde resin like Astromel® CR-1 available from Astro Industries, a division of Borden, Inc.

When these resins are used conventionally as a binder it is normal to add a strong acid catalyst in the aqueous binder solution and to cure at temperatures above about 350 degrees F. to fully and quickly cure the binder, providing hot wet strengths(soaked for 10 minutes in 180 degree F. water) of 90–100 percent. To "B" stage these resins in the present invention, very little or even no cure catalyst need be used, but in this case "B" stage cure temperatures of about 375 to 400 degrees is required. Preferably, up to about 10 weight percent, based on the weight of resin in the mat, most preferably about 5 to 10 weight percent, of a cure catalyst like ammonium nitrate is used to speed "B" staging at a relatively low temperature. The mat is cured at temperatures between about 300 and about 350 degrees F., such as 340 degrees F., for very short times, only 5–120 seconds, preferably 20–120 seconds. If the cure temperature is much less than 330 degrees F., the resultant mat will not have adequate strength for handling and processing in the intended uses to avoid damage. If the cure temperature is much above 360 degrees F. the resin could cure too much and the mat will not bond as well to wood later. Other catalysts can be used, such as organic aromatic acids like para-toluene sulfonic acid and organic acids like maleic acid.

Processes for making nonwoven fiber glass mats are well known and some of them are described in U.S. Pat. Nos. 4,112,174, 4,681,802 and 4,810,576, which references are hereby incorporated into this disclosure by reference, but any known method of making nonwoven mats can be used. The preferred technique for the making of mats of the present invention is forming a dilute aqueous slurry of fibers and depositing the slurry onto an inclined moving screen forming wire to dewater the slurry and form a wet nonwoven fibrous mat, on machines like a Hydroformer™ manufactured by Voith—Sulzer of Appleton, WS, or a Deltaformer™ manufactured by Valmet/Sandy Hill of Glenns Falls, N.Y.

Next, the wet, unbound mat is transferred to a second moving screen running through a binder application saturating station where the furfuryl alcohol formaldehyde resin based binder in aqueous solution is applied to the mat. The excess binder is removed, and the wet mat is transferred to a moving oven belt where the unbonded, wet mat is dried and cured to only a "B" stage, bonding the fibers together in the mat. The partially cured mat is then usually wound into rolls and packaged. Mats made with the furfuryl alcohol formaldehyde resin binder can be stored without being protected from a humid atmosphere, but mats made with phenolic resin or melamine formaldehyde resin binder should be stretch wrapped or shrunk wrapped or put into a plastic bag since these binders are hydroscopic and will take on moisture from a humid atmosphere.

The aqueous binder solution is preferably applied using a curtain coater or a dip and squeeze applicator. In the drying and curing oven the mat is heated to temperatures of up to about 350 degrees F., but this can vary from about 210 degrees F. to as high as any temperature that will not take the mat beyond "B" stage cure. The treatment time at these temperatures can be for periods usually not exceeding 1 or 2 minutes and frequently less than 40 seconds. The lower the temperature selected for the cure, the longer time required to reach "B" stage cure, but normally a temperature is selected that will reach "B" stage cure in no more than a few seconds, which is required on a commercial continuous glass mat manufacturing line.

EXAMPLE 1

A fiber slurry was prepared in a well known manner by adding 0.5 inch long wet E type glass chopped fiber having fiber diameters averaging about 10 microns to a known cationic white water containing Natrosol™ thickening agent available from Hercules, Inc. and a cationic surfactant C-61, an ethoxylated tallow amine available from Cytec Industries, Inc. of Morristown, N.J., as a dispersing agent to form a fiber concentration of about 0.8 weight percent. After allowing the slurry to agitate for about 20 minutes to thoroughly disperse the fibers, the slurry was metered into a moving stream of the same whitewater to dilute the fiber concentration to a concentration averaging about 0.05 to 0.06 weight percent before pumping the diluted slurry to a headbox of a Voith Hydroformer™ where a wet nonwoven mat was continuously formed.

The wet mat was removed from the forming wire and transferred to a Sandy Hill Curtain Coater where an aqueous UF binder (the Georgia Pacific UF described above), modified with (mixed with) about 24 weight percent, based on the dry weight of the UF resin, of a blend of 91.7 weight percent polyvinyl acetate homopolymer and 8.3 weight percent of an acrylic tripolymer, was applied in an amount to provide a binder level in the cured mat of about 19–20 weight percent. The wet mat was then transferred to an oven belt and carried through an oven to dry the mat and to fully cure the modified UF resin to a temperature of about 450 degrees F. The basis weight of the mat produced was 8.7 grams per square foot. The mat, containing 80–81 weight percent 10 micron E glass fiber and 19.5–21 percent modified urea formaldehyde binder, had the following strength properties:

| | |
|---|---|
| Hot Wet Tensile (10 minutes in 180 degree F. water) | 90+ percent |
| Thickness | 32–33 mils |
| Loss On Ignition | 19.5–21 weight percent |
| Machine Direction Tensile | 109 lbs./3 inches |
| Cross Machine Direction Tensile | 80 lbs./3 inches |
| Machine Direction Tear Strength | 500 grams |
| Cross Machine Dir. Tear Strength | 600 grams |

6 inch by 6 inch layer of this mat was placed between two 6 inch by 6 inch layers of softwood veneer, each having a thickness of about 0.10 inch. This stack was put into a hot press subjected to a pressure of about 77 psi and a temperature of about 350 degrees F. for about 5 minutes. After cooling the pressure was released and the stack was taken from the press. There was no bond between the wood layers and the mat layer.

EXAMPLE 2

Another mat was made in exactly the same way as in Example 1, except that the average fiber diameter was 10 micron and the binder applied to the wet nonwoven mat was an aqueous solution of FAREZ® X4P furfuryl alcohol formaldehyde (FAF) resin binder and the wet mat was dried and then heated to about 300–350 degrees F. for 1–2 minutes to "B" stage the resin binder. This finished mat contained 62.3 weight percent 0.75 inch long, 13 micron E glass fiber and 37.7 percent "B" staged FAF resin and had a basis weight of 1.7 lbs./100 square feet. the following physical properties:

| | |
|---|---|
| Volatiles in the mat | 6 weight percent (based on resin weight) |
| Thickness | 27 mils |
| Hot wet tensile | 31 percent |
| Loss On Ignition | 37.7 weight percent |
| Machine Direction Tensile | 31 lbs./3 inch wide sample |
| Cross Machine Tensile | 29 lbs./3 inch wide sample |

The mat made in Examples 1 and 2 above were used to make a laminated wood sandwich in the same manner as described in Example 1 except that the sandwich was subjected to 375 degrees F. for about 90 seconds at the same pressure. The same test was repeated using one-eighth inch hardboard instead of the softwood veneer. In both cases, the mat of Example 2 bonded the wood veneer and hardboard together tightly such that they could not be pulled apart by hand.

A layer of mat made according to this example was then placed on top of one layer of the softwood veneer and a Teflon® separator sheet was placed on top of the mat before putting the sandwich into the press. This sandwich was pressed under the same conditions as above and removed. When the separator sheet was removed (it didn't bond to the mat) the mat was bonded tightly to the wood veneer and provided a tough surface that would act to dimensionally stabilize the layer of wood and protect the wood from physical abuse.

EXAMPLE 3

A mat was made as in Example 2, except that the basis weight was increased to 5.1 lbs./100 sq. ft. The mat properties were as follows:

Volatiles—5.3 wt. percent of resin in mat

Hot wet strength—23 percent

Thickness—29 mils

Machine Direction (MD) Tensile Strength—48 lbs./3 inches

Cross Machine (CMD) Tensile Strength—46 lbs./3 inches

Mat made in this example was tested in the same manner as the mat in Example 2 and the results were even better.

EXAMPLE 4

Mat was made exactly the same as in Example 1 except that the resin used was Georgia Pacific's 144D64 phenol formaldehyde (PF) and the mat was dried and heated to 320 degrees F. for 5 minutes to "B" stage the PF resin binder. The finished mat contained 52.5 percent glass fiber and 47.5 percent "B" staged PF resin, was very hydroscopic and had the following properties:

Basis weight—3 lbs./100 sq. ft.

Volatiles—4.3 percent of the resin

Thickness—35 mils

Hot wet tensile—0 percent

MD tensile—70 lbs./3 inches

CMD tensile—60 lbs./3 inches

This mat was tested in the same manner as described in Example 2 and produced similar results as the "B" staged FAF resin bound mat.

This mat was also laminated to each face of a one eighth inch thick hardboard and to each side of a one half inch thick oriented strand board using the laminating procedure described in Example 2. Samples were cut from these two laminates and from the unfaced hardboard and unfaced oriented strand board. All of these samples were then tested for modulus of rupture, flexural strength, with the well known three point loading procedure. The results were as follows:

TABLE

| Sample | Modulus of Rupture (psi) | % Change |
|---|---|---|
| Hardboard | 80 | 0 |
| Mat/hardboard/mat laminate | 114 | +42.5 |
| Oriented Strand Board (OSB) | 125 | 0 |
| Mat/OSB/Mat | 173 | +38.4 |

The mat layers did not delaminate from either the hardboard or the OSB preceding or during failure of the laminate, but instead broke with the hardboard and the OSB. This higher flex strength of the laminates means that laminate beams made with the mats of the present invention and in accordance with the present invention can span greater lengths, support greater loads or both compared with laminates of the wood products alone.

EXAMPLE 5

Mat was made exactly the same as in Example 1 except that the resin used was Borden's Astromel® CR-1 melamine formaldehyde (MF) resin described earlier in the specification and the mat was dried and heated to 320 degrees F. for 1–2 minutes to "B" stage the MF resin binder. The finished mat had the following properties:

Basis weight—2.3lbs./100 sq. ft.

Thickness—26 mils

Hot wet strength—less than 10 percent

MD tensile—35 lbs./3 in.

CMD tensile—27 lbs./3 in.

This mat was tested in the same manner as described in Example 2 and showed similar results.

While the preferred embodiments of the invention have been disclosed in detail, other embodiments within the described invention and having other functional additives known or obvious to those skilled in the art are considered as part of the present invention and are intended to be included in the invention claimed below.

I claim:

1. A laminate sandwich comprised of wood or a wood product in contact with a glass fiber nonwoven mat comprising glass fibers bonded together with about 15–75 weight percent of a resin binder wherein the resin binder is derived from an aqueous resin selected from a group consisting of furfuryl alcohol formaldehyde based resin, phenol formaldehyde resin and melamine formaldehyde resin and mixtures thereof, which resin is only partially cured to a "B" stage condition.

2. The laminate as described in claim 1 wherein the major portion of the mat is glass fibers and up to 75 weight percent of the mat is fibers.

3. The laminate as described in claim 1 wherein the mat also contains up to about 10 weight percent of a cure catalyst in the resin binder.

4. The laminate as described in claim 1 wherein said glass fibers are less than 3 inches long and are in the form of a nonwoven mat.

5. The laminate as described in claim 3 wherein said glass fibers are less than 3 inches long and are in the form of a nonwoven mat.

6. The laminate of claim 1 wherein said mat also contains cellulosic fibers or fibers of a cellulosic derivative.

7. A product produced by the method of pressing a wood or wood product against a fiber glass nonwoven mat while being heated to complete the cure of the binder in the mat, said mat comprising glass fibers bonded together with about 15–75 weight percent of a resin binder wherein the resin binder is derived from an aqueous resin selected from the group consisting of furfuryl alcohol formaldehyde based resin, phenol formaldehyde resin and melamine formaldehyde resin and is only partially cured to a "B" stage condition.

8. A product as described in claim 7 wherein the major portion of the mat is glass fibers and up to 75 percent of the mat is fibers.

9. A product as described in claim 8 wherein the mat also contains a cure catalyst in the resin binder.

10. A product described in claim 7 wherein said glass fibers are less than 3 inches long are in the form a nonwoven mat.

11. A product as described in claim 9 wherein said glass fibers are less than 3 inches long and are in the form of a nonwoven mat.

12. A product as described in claim 7 wherein the resin binder in the mat contains up to 10 weight percent of a cure catalyst.

* * * * *